United States Patent Office 3,303,909
Patented Feb. 14, 1967

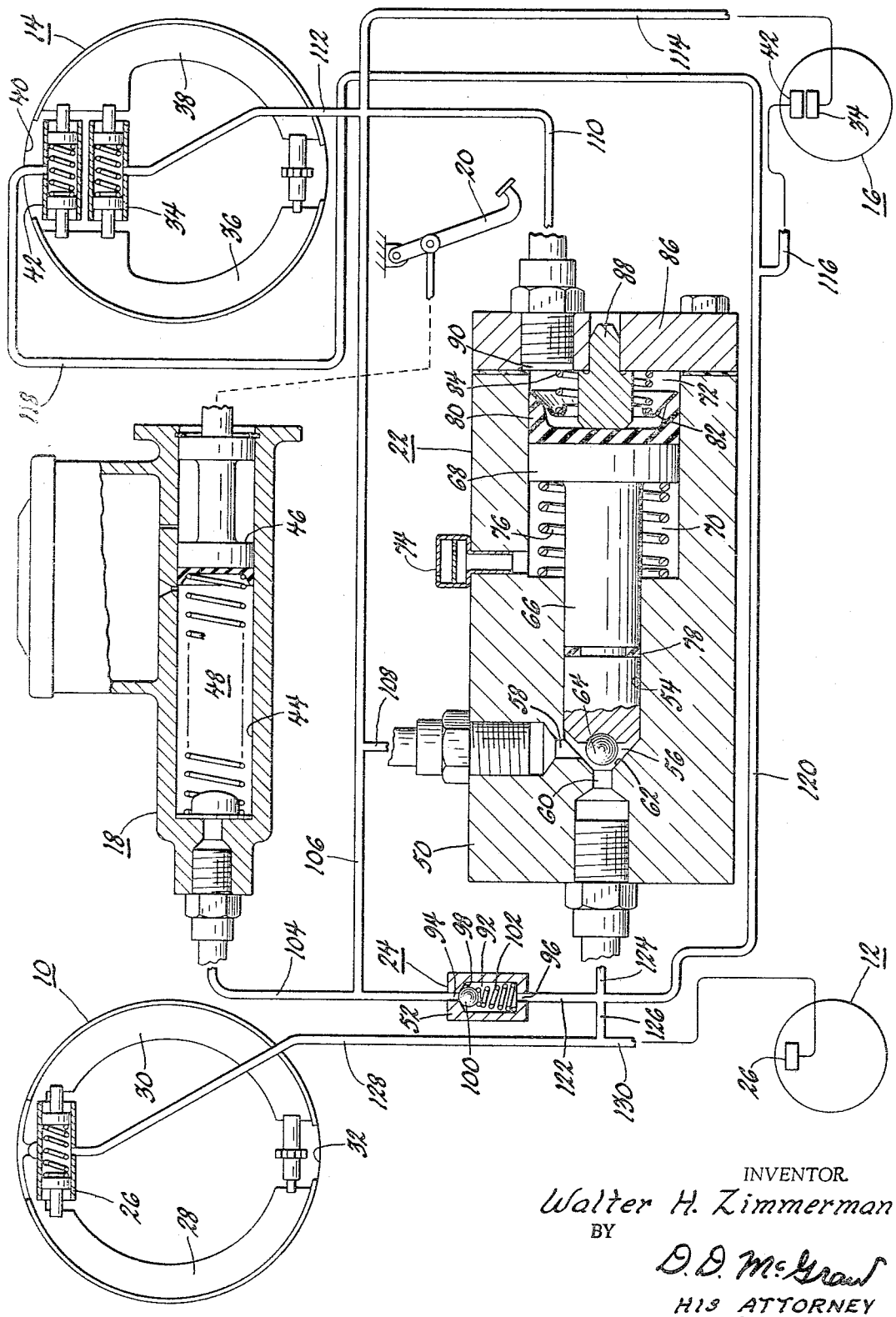

3,303,909
SERVO ACTUATED BRAKE AND
VALVE MEANS THEREFOR
Walter H. Zimmerman, Rochester, Mich., assignor to General Motors Corporation, Detroit, Mich., a corporation of Delaware
Filed Apr. 1, 1965, Ser. No. 444,654
8 Claims. (Cl. 188—152)

The invention relates to brake systems and methods of operating brake systems. It more particularly relates to brake systems of the type used in a verhicle wherein one group of wheel brakes is actuated by the vehicle operator and another group of wheel brakes is energized by servo action of the first group of brakes.

It has been proposed in the prior art to provide a brake system wherein a master cylinder actuates a set of brakes such as the rear brakes of a vehicle, and the mechanical servo action of the actuated rear brakes then pressurizes fluid to actuate the front brakes of the vehicle. While such a system has an advantage in that greater vehicle braking effort is obtained in stopping a vehicle while requiring less operator force, it is at a disadvantage since the secondary operated brakes are completely dependent upon performance of the primary operated brakes. If, for example, the first operated brakes, which are preferably the rear brakes of the vehicle, completely fade so that there is no substantial braking action and, therefore, no substantial mechanical braking reaction, a complete loss of front braking effort is suffered.

It is now proposed to provide a brake system which in its preferred embodiment is used in a vehicle having front and rear brakes. The vehicle has a master cylinder which by utilization of the invention permits application of both the front and rear brakes with the primary pressure being generated by the master cylinder. A valving system embodying the invention and utilized in the braking system operates so that when the line pressure developed by the torque output or servo action of the rear brakes exceeds the line pressure generated in the master cylinder by action of the vehicle operator, the higher or secondary line pressure so generated actuates the front brakes. The system also provides for venting of the front brake fluid system to the master cylinder and its reservoir between brake applications so as to prevent a buildup of pressure in the front brake hydraulic circuit due to temperature variations, and also to compensate for any brake fluid loss. Methods of operating a brake system are also contemplated as a part of the invention wherein a braking system may be operated to initially pressurize the wheel cylinders of front and rear brakes by a first pressure generator, discontinue pressurization of the front brakes by the first pressure generator, and further pressurize the wheel cylinders of the rear brakes by the first pressure generator, with second pressure generators being provided to take brake shoe reaction forces of the rear brake assemblies and generate fluid pressure which actuates the front brakes. A preferred manner of practicing such a method utilizes pressure responsive valves and valve actuators which selectively connect and disconnect the primary or master cylinder supplied fluid pressure circuit and the secondary or torque reaction pressurizing cylinder actuated fluid pressure circuit. Braking methods embodying the invention also provide for pressurization of the front wheel brakes when the rear wheel brake pressurizing cylinders are incapable of so acting. Methods embodying the invention further include steps of operation wherein both the primary and secondary fluid pressure circuits are relieved to a common fluid reservoir upon brake release to provide for corrections in fluid volume in each system.

In the drawing:
The single figure is a schematic representation of a vehicle brake system embodying the invention, with parts broken away and in section.

The vehicle brake system includes front brake assemblies 10 and 12, rear brake assemblies 14 and 16, a master cylinder 18, a brake pedal 20, valve mechanism including the valve assembly 22 and the check valve assembly 24, and fluid conduits connecting these elements. Each front brake is illustrated as being of the duo servo type with a wheel cylinder 26 actuating the brake shoes 28 and 30 into engagement with a brake drum 32 to provide vehicle braking. The rear brake assemblies are similarly constructed.

Each rear brake assembly is provided with a wheel cylinder 34, brake shoes 36 and 38 and a brake drum 40. The rear brakes are constructed as duo-servo brakes so that a mechanical servo action is obtained when the brakes are actuated. Additionally, each rear brake assembly is provided with a pressurizing cylinder 42 which is located adjacent a wheel cylinder 34 and may be constructed in much the same manner as the wheel cylinder. The pressurizing cylinders 42 are preferably located diametrically outside the wheel cylinders 34 since the mechanical servo action of the brake shoes during brake actuation is greater toward the outer ends of the shoes. The pressurizing cylinders provide means for generating a fluid pressure in response to actuation of the rear brake assemblies by the wheel cylinders 34.

The master cylinder 18 is illustrated as a type commonly used in vehicles and has a cylinder bore 44 in which a pressurizing piston 46 is reciprocably moved by a vehicle operator through pedal 20 to pressurize fluid in chamber 48.

The valve mechanism is schematically illustrated as being in two parts including the valve assembly 22 and the check valve unit 24. However, the valve mechanism may be provided in a unitary body so that the valve assembly housing 50 and the check valve housing 52 may be a common housing.

The housing 50 of valve assembly 22 has a bore 54 formed therein. One end of the bore forms a valve chamber 56 which has an inlet port 58 and an outlet port 60. The end of port 54 adjacent port 60 is formed to provide a valve seat 62 for the ball valve 64 contained in the valve chamber. A piston 66 provides valve closing means for valve 64 and is reciprocably received in bore 54. One end of the piston provides a seat for the ball valve 64. Due to the ramp construction of the end of piston 66 and of the valve seat 62, and the walls of the valve chamber 56, ball valve 64 is normally open. It is closed only when piston 66 moves to the left to hold it against the valve seat 62.

Piston 66 has a head 68 received in an enlarged section of bore 54. The enlarged bore section receiving head 68 provides a chamber 70 on one side of the head and a chamber 72 on the other side of the head. Chamber 70 is vented to atmosphere by vent 74 to prevent occurrence of a fluid lock condition. A compression spring 76 is so received in chamber 70 as to urge the piston 66 to the right as seen in the drawing, thereby tending to hold the ball valve 64 in the open position. A seal 78 engages bore 54 and piston 66 so as to seal chambers 56 and 70 from each other. A sealing cup 80 is provided adjacent the piston head 68 in chamber 72. A spring seat and cup expander 82 acts on cup 80 to keep the cup lip engaged with the bore wall of chamber 72 and also receives one end of spring 84. The other end of spring 84 is positioned against the side of the bore cover plate 86, which closes the open end of chamber 72. A piston stop pin 88 is suitably mounted in plate 86 so as to provide a stop for piston head 68 and sealing cup 80. Spring 84 is lighter than spring 76 so that the piston head is normally positioned as shown in the drawing when there is little or no fluid pressure in chamber 72. A pressure supply port 90 is provided in cover plate 86 and connects with chamber 72.

The check valve assembly 24 has a valve chamber 92 formed in the housing 52. Chamber 92 has a first port 94 and a second port 96. Port 94 is provided with a valve seat 98 against which the check valve 100 is held by a compression spring 102. Spring 102 is so calibrated in relation to the area of valve 100 exposed to pressure in port 94 when the valve is seated against seat 98 as to open at a predetermined pressure differential by which the pressure in port 94 exceeds the pressure in chamber 92 and port 96.

A primary fluid pressure circuit is provided in which the master cylinder is the primary fluid pressurizing means. The master cylinder pressure outlet conduit 104 is fluid connected to check valve port 94 and a distribution conduit 106. Conduit 108 fluid connects conduit 106 and the inlet port 58 of the valve assembly 22. Conduit 110 interconnects conduit 106 and the port 90 of the valve assembly 22. Conduits 112 and 114 connect distribution conduit 106 with the rear brake wheel cylinders 34, which constitute first fluid pressure actuated brake energizing means.

A second fluid pressure circuit includes conduits 116 and 118 leading from the pressurizing cylinders 42, providing secondary fluid pressurizing means, and joining to provide a single conduit 120 which is in turn connected to port 96 of the check valve assembly 24 by conduit 122, and to port 60 of the valve assembly 22 by the conduit 124. Check valve assembly 24 provides normally closed pressure differential responsive valve means. Conduit 120 is also connected by conduit 126 to conduits 128 and 130 which are in turn connected to the wheel cylinder assemblies 26 of the front brake assemblies 10 and 12, which constitute second fluid pressure actuated brake energizing means. If the check valve housing 52 is integral with the housing 50 of the valve assembly 22, the check valve port 94 may be connected with conduit 108 and the check valve port 96 may be connected with the conduit 124 instead of as shown.

The system is illustrated in the brake released position. When the vehicle is traveling on a road, and the operator desires to apply the vehicle brakes, he depresses the brake pedal 20. The brake pedal linkage acts on the master cylinder piston 46 to pressurize brake fluid in the chamber 48. This fluid pressure is conducted through conduits forming the primary fluid pressure circuit to inlet 94 of check valve assembly 24, ports 58 and 90 of valve assembly 22, and rear brake wheel cylinders 34. As is well known, some fluid pressure is required to move the shoes outwardly against their retracting springs so that they contact the drums. While the pressure required to engage the shoes to the drum varies considerably in different installations, it may fall within the range of 50 to 75 p.s.i., by way of example. The pressure initially built up in chamber 48, and therefore conducted to the above noted ports and the rear wheel cylinders, acts to expand the rear brake shoes 36 and 38 into contact with the brake drum. The pressure entering port 90 acts against the piston head 68 through the sealing cup 80 so as to oppose the force of spring 76. The pressure entering port 58 passes through chamber 56 and out port 60 and into the secondary fluid pressure circuit to the front wheel cylinders 26 as well as the pressurizing cylinders 42 of the rear brakes. Thus the master cylinder generated pressure initially actuates all of the wheel cylinders to move the brake shoes of all of the brake assemblies toward their respective brake drums. The area of piston head 68 and the force of spring 76, as well as the area of the other end of piston 66, is preferably so calibrated as to permit the piston to move to the left under force generated by pressure in chamber 72 to seat valve 64 against valve seat 62 at a predetermined pressure. This pressure may be approximately the pressure required to move the brake shoes outwardly into engagement with the brake drums. At this time fluid pressure from port 58 is disconnected from fluid pressure in port 60, and, therefore, the primary fluid pressure circuit is disconnected from the secondary fluid pressure circuit. Pressure generated by the master cylinder does not further expand the front wheel cylinders 26 or the pressurizing cylinders 42 of the rear brakes. As the operator continues to depress brake pedal 20, however, fluid pressure is built up in rear brake wheel cylinders 34 so that the brake shoes 36 and 38 are forced against their respective drums and rear wheel braking action begins. Since the rear brakes are constructed as duo-servo brakes, there is a mechanical servo action well known to those skilled in the art. The reaction force is exerted on one piston of each pressurizing cylinder 42. When the vehicle is moving in the forward direction, this reaction force is exerted by secondary shoes 38. Since in the initial application of brake pressures, pressurizing cylinders 42 were expanded concurrently with wheel cylinder 34, the piston operatively engaged by the primary shoe 36 followed that shoe outwardly and remained in that position. The reaction force causes pressure to be generated in pressurizing cylinders 42 and this pressure is transmitted throughout the secondary fluid pressure circuit to the front wheel cylinders 26, the check valve chamber 92, and port 60 of the valve assembly 22. Thus the rear brakes are applied by master cylinder pressure as a first fluid pressure source, and the front barkes are applied by servo action forces generated by the application of the rear brakes and acting on the pressurizing cylinders 42 as a second fluid pressure source. Since the secondary pressure is exerted in valve assembly 22 only against the relatively small area of ball valve 64 closing port 60, this pressure is effectively blocked from the master cylinder and is not free to act on the master cylinder piston and push the pedal back against the driver's foot. The brake feel obtained by the driver is only that required to push and hold the wheel cylinders 34 in the desired brake engaged condition. Therefore, the force required to actuate the brake system by the operator is considerably less. The braking action of the front brakes is obtained from a power source other than the power source required to actuate the master cylinder. However, the pressure actuating the front wheel brakes is related to the power required to actuate the rear wheel brakes since the mechanical reaction force of the servo action of the rear brakes is related to the amount of rear wheel brake braking force.

If for some reason, such as the failure of the pressurizing cylinder 42 to pressurize fluid, insufficient pressure is generated in the secondary circuit, a pressure differential is applied to the check valve 100 of the valve assembly 24 which is sufficient to overcome the force of spring 102. This spring force is calibrated to a predetermined pressure differential for this purpose. Pressure from the master cylinder then enters chamber 92 through inlet 94 and passes out through the check valve port of inlet 96 to the secondary circuit and actuates the front wheel cylinders.

By a different arrangement of spring forces of the spring 102 and spring 76, a somewhat different and effective operation may also be obtained. By utilizing a very light spring 102 in the check valve assembly 24 which, by way of example but not by way of limitation, may set up a pressure differential of 5 p.s.i. instead of 150 p.s.i., another method of operation may be obtained. Actuation of the master cylinder 18 to generate the primary pressure and overcome the light resistance of check valve spring 102 so that primary pressure is transmitted to the secondary circuit through the check valve assembly at an early stage. Under this condition of operation, spring 76 may also be lighter, so that valve 64 is closed at the time or shortly after the time, based on a pressure buildup, that valve 100 opens. Thus the primary pressure initially expands the front brake wheel cylinders and the rear brake pressurizing cylinders 42 by flowing through the check valve assembly 24. As the rear brakes are actuated and the mechanical servo action occurs, the secondary circuit pressure is built up by the presurizing cylinders 42. When it approaches the primary pressure, the check valve 100 closes and the secondary pressure generated by the pressurizing cylinders 42 actuates the front brakes through the front wheel cylinders 26. As before, the higher secondary pressure thus generated acts on valve 64 and therefore piston 66, only on the small area of port 60 so that it is insufficient to move the piston 66 and unseat the valve 64. Thus the higher secondary pressure cannot act to transmit brake reaction force to the master cylinder piston 46, and the operator is not required to overcome this reaction force in order to apply and hold the brakes. Should the secondary circuit pressure generated by the pressurizing cylinders 42 be less than primary circuit pressure generated by the master cylinder 18 by the pressure differential set up by spring 102 (in the above example, 5 p.s.i.) check valve 100 will again open and primary pressure will be supplied to the secondary fluid pressure system and will again pressurize both the front and rear wheel cylinders to actuate both the front and rear brakes.

When the brakes are released by the pedal 20, the pressure in the primary braking circuit is diminished and the hydraulic servo braking force on the rear wheel brakes is likewise diminished. It then follows that the mechanical servo action generating the reaction force which pressurizes fluid in pressurizing cylinders 42 is also diminished, thereby diminishing the pressure in the secondary circuit to the front wheel brakes. The total braking force acting on the vehicle is, therefore, diminished. When the primary pressure from the master cylinder 18 is sufficiently diminished, spring 76 moves piston head 68 to the right, opening valve 64 and thereby reconnecting the secondary circuit and the primary circuit through chamber 56. The wheel cylinders and the pressurizing cylinders of the front and rear brakes are therefore permitted to decrease in volume as the brake shoes are retracted and the excess fluid is returned to master cylinder chamber 48 and the master cylinder reservoir through the valve assembly 22.

A brake system has thus been provided which permits applying both the front and the rear brakes with the primary pressure until the secondary pressure developed by the torque output of the rear brake exceeds the primary pressure, after which the higher secondary line pressure actuates the front brakes. At the same time the vehicle operator is required to overcome less reaction force to obtain full braking action. The valve mechanism in the system permits this mode of operation. It also vents the front brake fluid pressurizing circuit to the master cylinder between brake applications so as to prevent pressure buildup due to temperature variations as well as to compensate for brake fluid seepage. It eliminates the complete dependence of the front brakes on the performance of the rear brakes. Thus if the rear brakes should completely fade, the front brakes may still be applied and their braking action will not be completely lost.

A method of vehicle brake operation which may be carried out by the above described structure may also be performed by other mechanisms, and steps thereof may be performed manually. For example, initial pressurization of the front and rear brakes may be accomplished by operation of a manual valve connected with a stored pressure source such as an accumulator. The step of discontinuation of front brake pressurization may be accomplished by a manual pressure cutoff, or by a deceleration sensitive cut-off such as a pendulum operated valve. Forces other than torque reaction may be utilized to further pressurize the front brake and still be generated by braking action of the rear brake. For example, a deceleration sensitive pressurizer, with or without a booster, can be used for this purpose since the deceleration force would be generated by braking action of the rear brake.

What is claimed is:

1. In a brake system comprising a master cylinder, a first brake assembly having a servo action, a second brake assembly, a pressurizing cylinder actuated by the servo action of said first brake assembly, a primary fluid pressure circuit fluid connecting said master cylinder and said first brake assembly, and a second fluid pressure circuit fluid connecting said pressurizing cylinder and said second brake assembly,
   a valve assembly having
     a normally open valve and pressure actuated valve closing means fluid connected to said primary fluid pressure circuit and closing said normally open valve at a predetermined master cylinder output pressure,
     a passage controlled by said normally open valve and having an inlet fluid connected to said primary fluid pressure circuit and an outlet fluid connected to said secondary fluid pressure circuit,
     and a normally closed check valve interconnecting said primary and secondary fluid pressure circuits and operative to open when fluid pressure in said primary fluid pressure circuit exceeds fluid pressure in said second fluid pressure circuit by a predetermined amount,
   said master cylinder thereby being operative to pressurize both of said fluid pressure circuits when said normally open valve is open or when said check valve is open to actuate both of said brake assemblies, and being operative to pressurize only said primary fluid pressure circuit when said normally open valve and said check valve are closed to actuate only said first brake assembly, the servo action of said first brake assembly then actuating said pressurizing cylinder to pressurize said secondary fluid pressure circuit to actuate said second brake assembly.

2. A brake system comprising: a master cylinder; a front brake; a rear brake energized by pressure from said master cylinder, said rear brake having a pressurizing cylinder connected to pressurize fluid to actuate the front brake in accordance with rear brake mechanical servo action;
   a valve control assembly comprising
   a valve housing having a valve chamber formed therein,
   a normally open valve in said chamber,
   a chamber pressure inlet and a second pressure inlet each receiving pressure from said master cylinder and a chamber pressure outlet fluid connected to said front brake,
   a valve closing servo mounted in said housing connected to receive pressurized fluid from said master cylinder through said second pressure inlet and to act on said valve,
   and spring means opposing the valve closing action of said servo;
   said master cylinder thereby being fluid connected to actuate said front brake through said valve chamber until the master cylinder pressure overcomes said spring means to close said valve;
   and a second valve formed as a normally closed check valve and fluid connected with pressure from said master cylinder and pressure actuating said front brake to open when pressure from said master cylinder exceeds pressure actuating said front brake by a predetermined amount.

3. A vehicle brake system comprising: a master cylinder; a vehicle front brake; a vehicle rear brake; one of said brakes having a brake servo reaction force energized pressuring cylinder fluid connected to pressurize fluid to actuate the other of said brakes, the pressurization of said front and rear brakes being first accomplished by said master cylinder and second accomplished by the pressurization of said other of said brakes in response to braking servo reaction forces generated by master cylinder pressurization of said one of said brakes; and a valve assembly comprising, a housing having a bore therein, a piston reciprocably received in said bore, one bore end having a normally open valve received therein closable by movement of said piston and a fluid pressure inlet connected to receive fluid pressure from said master cylinder and a fluid pressure outlet and a valve seat for said valve surrounding said fluid pressure outlet for transmitting fluid pressure from said master cylinder to the other brake when said valve is open, spring means acting on said piston to yieldingly hold said valve open, and a pressure chamber formed in said housing as a part of said bore and having one wall thereof formed by said piston and receiving fluid pressure from said master cylinder acting on said piston in opposition to said spring means for closing said valve at a predetermined master cylinder pressure.

4. The brake system of claim 3 wherein said valve assembly further comprises a normally closed check valve fluid connecting said fluid pressure inlet and said fluid outlet and opening to provide a fluid connection between said inlet and said outlet when the pressure in said inlet exceeds the pressure in said outlet by a predetermined amount.

5. A method of vehicle brake operation comprising the steps of simultaneously initially pressurizing a vehicle front brake and a vehicle rear brake from a pressure source, subsequently discontinuing pressurization of the front brake from the pressure source, further pressurizing the rear brake from the pressure source and further pressurizing the front brake by means of force generated by braking action of the rear brake, and reinstating pressurization of the front brake by the pressure source when the pressure source pressure exceeds the front brake pressure by a predetermined pressure difference.

6. The method of claim 5 in which the step wherein the pressurization of the front brake is discontinued from the pressure source occurs at a predetermined pressure source pressure.

7. The method of claim 5 in which completion of the step of discontinuing pressurization of the front brake from the pressure source pressure occurs substantially concurrently with the commencement of the step of further pressurizing the rear brake from the pressure source and further pressurizing the front brake by means of force generated by the braking action of the rear brake.

8. A method of multiple brake operation comprising the steps of initially pressurizing a first brake and a second brake and a second fluid pressure generator from a first fluid pressure generator through a first fluid pressure flow control and closing a second fluid pressure flow control, closing the first fluid pressure flow control and subsequently pressurizing only the first brake from the first fluid pressure generator and pressurizing the second brake from the second fluid pressure generator, releasing the pressure on the first brake and opening the second fluid pressure flow control and returning fluid pressure from the second pressure generator and the first and second brakes through the second fluid pressure flow control in fluid parallel flow relation to the first control.

References Cited by the Examiner

UNITED STATES PATENTS

| 2,207,173 | 7/1940 | Goepfrich | 188—152 |
| 2,321,479 | 6/1943 | Freeman | 188—152 |
| 3,194,019 | 7/1965 | Lepelletier | 188—152 |

FOREIGN PATENTS

| 951,602 | 3/1964 | Great Britain. |

MILTON BUCHLER, *Primary Examiner.*

FERGUS S. MIDDLETON, *Examiner.*

G. E. A. HALVOSA, *Assistant Examiner.*